United States Patent [19]

Uhen

[11] Patent Number: 4,781,476
[45] Date of Patent: Nov. 1, 1988

[54] METHOD OF CIRCULATING LUBRICANT FOR AN ELECTRIC MOTOR

[75] Inventor: Richard F. Uhen, Fort Wayne, Ind.

[73] Assignee: General Electric Company, Fort Wayne, Ind.

[21] Appl. No.: 940,663

[22] Filed: Dec. 11, 1986

Related U.S. Application Data

[62] Division of Ser. No. 796,827, Nov. 12, 1985, Pat. No. 4,635,352, which is a division of Ser. No. 584,622, Feb. 29, 1984, Pat. No. 4,565,937.

[51] Int. Cl.$^4$ ............................................. F16C 17/00
[52] U.S. Cl. ................................................. 384/136
[58] Field of Search ............... 384/135, 136, 478, 398, 384/412

[56] References Cited

U.S. PATENT DOCUMENTS 988,138   3/1911  Penny et al. ................. 384/136
4,397,571 8/1983  Morrill ....................... 384/398
4,565,937 1/1986  Uhen .

Primary Examiner—Lenard A. Footland
Attorney, Agent, or Firm—Ralph E. Krisher, Jr.

[57] ABSTRACT

A lubricant slinger mechanism for preventing the loss of oil or other lubricant which is pumped between the rotor shaft and bearing in an electric motor or other dynamoelectric machine. The slinger is mounted to the rotor shaft and mounted adjacent the end of the bearing out of which oil flow at it is pumped along the shaft from the reservoir. The slinger initially throws the oil radially outward against an inner oil well cover, and the provision of an impeller, such as a spiral vane on the outer peripheral surface of the slinger, imparts an axial component of velocity to the lubricant which impels it rearwardly toward the reservoir and prevents the migration of oil out of the forward end of the oil cover through which the rotor shaft extends. The slinger, in one form thereof, includes an annular cup portion which overhangs the end of the bearing so that lubricant is thrown off the slinger at a point rearwardly of the end of the bearing. The slinger is preferably formed with an opening that is larger in diameter than the shaft and includes a tapered surface on one end so that as the brass rotor sleeve is inserted into it, it centers the slinger and enables the brass sleeve to be pressed therein by means of automatic assembly machinery.

2 Claims, 3 Drawing Sheets

METHOD OF CIRCULATING LUBRICANT FOR AN ELECTRIC MOTOR

This is a divisional of application Ser. No. 796,827, filed Nov. 12, 1985, (now U.S. Pat. No. 4,635,352) which in turn is a division of Ser. No. 584,622, filed Feb. 29, 1984, (now U.S. Pat. No. 4,565,937).

BACKGROUND OF THE INVENTION

The present, invention relates in general to dynamoelectric machines, such as electric motors and generators, and in particular to an improved method for controlling the flow of lubricant within the motor.

One type of electric motor, for example, the 51 frame fan motor manufactured by the General Electric Co., employs a self-contained lubricating system for lubricating the rotor shaft sleeve bearing and for carrying heat out of the bearing. U.S. Pat. No. 2,522,985 to Harl C. Bradley is an example of this type of motor.

The motor includes a reservoir located coaxially with the rotor shaft comprising a lubricant saturated absorbent material, such as wool felt, and a wool felt wick which transfers the lubricant, such as an appropriate oil, to a spiral groove on the rotor shaft. As the shaft rotates, lubricant is drawn from the reservoir and pumped along the shaft to establish a lubricant film between the shaft and sleeve bearing which rotatably supports it. Since the lubricant flows out of the end of the bearing, motors of this type are conventionally provided with a lubricant thrower or slinger in the form of an enlarged diameter ring on the shaft which throws any lubricant which reaches the slinger radially outward into an enclosing oil well cover. In some cases, an annular splash wick is positioned within the oil cover so that lubricant thrown radially outward will be absorbed by it and be conveyed more readily back to the reservoir through passages in the rotor supporting structure.

Although the previously used lubricant slinger has been effective in assisting in returning the lubricant back to the reservoir, some motors of this type have been subject to sporadic lubricant leakage problems. The oil circulation path between the reservoir and end of the bearing can be effectively sealed in the rearward portion of the motor, but the inner oil well cover is open on its forward end to permit passage of the rotor shaft therethrough. Since lubricant is thrown radially outwardly against the oil well cover, on some occasions, the lubricant tends to migrate forwardly beyond the slinger and out the forward end of the oil cover where it is lost into the stator compartment. This not only results in a decrease in the lubricant available for circulation through the bearing, but the lubricant can begin to leak from the motor case.

It has been found that prior lubricant slingers, such as the enlarged rotor shaft slingers as shown in U.S. Pat. No. 2,522,985 or the cylindrical oil slingers comprising a cylindrical washer-like element affixed to the rotor shaft, tend to throw the lubricant off in a fanned out pattern. Although most of the lubricant is slung radially outward, a portion of the lubricant slung by the forward and rear edges of the prior slingers is thrown off at angles to the shaft axis such that the lubricant has forward and rearward, respectively, components of velocity. Thus, the lubricant thrown off the forward edge of the slinger has a significant component of velocity towards the open end of the inner oil well cover, thereby contributing to the aforementioned migration of lubricant out into the stator housing of the motor.

Motors of the type shown in U.S. Pat. No. 2,522,985 are designed to be operated with the shaft horizontal, with the shaft vertical and the reservoir at the bottom, or any position inbetween. If the motor becomes tilted such that the forward end of the shaft at the opening in the inner oil well cover is lower than the end of the shaft in the reservoir, however, lubricant tends to pool at the open end of the inner oil well cover. This not only prevents the lubricant from being recirculated, but can increase the possibility of its being discharged through the forward opening in the inner oil well cover and thrown outwardly by the rotor.

The problem of oil leakage described above is not necessarily limited to the type of motor described in U.S. Pat. No. 2,522,985. Other dynamoelectric machines, such as motors and generators, may exhibit similar problems where the oil being pumped between bearing surfaces tends to migrate out of a semisealed oil circulation system.

SUMMARY OF THE INVENTION

The oil leakage problems with prior art motors described above is overcome by the present invention, in one form thereof, by providing a lubricant slinger that is configured such that it imparts an axial component of velocity in a direction generally toward the reservoir to lubricant which is thrown by the slinger. Although prior slingers may throw some of the lubricant with a relatively happenstance rearward component of axially velocity, the modification to the slinger provided by the present invention, in one form thereof, provides a substantial and intentional rearward slinging action and substantially eliminates the throwing off of lubricant at an angle in the forward direction toward the opening in the inner oil well cover, and also blocks the migration of oil through the opening. The result produced by the improved slinger is that the lubricant thrown by the slinger is thrown either radially outwardly or rearwardly, but the forward throwing and forward migration of the lubricant in the same axial direction as the lubricant is pumped through the bearing is blocked.

The tendency of the lubricant to migrate forwardly is further reduced, in accordance with one form of the invention, by causing the lubricant to be thrown outwardly by the slinger at a point rearward, that is, back toward the reservoir, of the end of the bearing out of which the lubricant is pumped. Since the lubricant is initially slung at a point further back from the opening in the inner oil well cover and closer to the reservoir, the lubricant has a greater tendency to be returned to the reservoir rather then migrate out of the oil well cover opening. One way to accomplish this, as shown in one form of the invention illustrated herein, is to provide a cupshaped slinger which overhangs the end of the bearing thereby providing a rearward flow path for the lubricant pumped out of the bearing until it is thrown outwardly off the rearwardly facing edge of the slinger.

In a preferred form of the invention, the outer peripheral surface of the cup-shaped portion of the slinger is provided with a vane which is pitched in a direction to impart a rearward component of velocity to the lubricant to enhance the migration of the lubricant back toward the reservoir. This vane may take the form of a single or multiple turn spiral flight, a plurality of angled blades, or other structure which provides the desired rearward impelling of the lubricant. The combination of throwing the lubricant outwardly at a point rearwardly of the end of the bearing together with the axial impeller structure on the slinger greatly reduces the tendency of the lubricant to migrate forwardly out of the oil well cover opening, thereby preventing loss of lubricant from the lubricant recirculation system of the motor.

The tendency of lubricant to collect or pool in the forward end of the inner oil well cover when the motor is slightly tilted with its forward end lower than its rear end is overcome, according to another inventive feature, by providing an inner oil well cover which is tapered such that it diverges in the rearward direction toward the lubricant reservoir. When the motor is operated with its shaft horizontal, the tapered oil cover presents a lower surface which is sloped toward the reservoir so that lubricant flows by gravity back through the openings in the motor case to the reservoir. Even if the motor should be tilted slightly such that its forward end is lower than its rear end, the tapered oil cover will provide some degree of compensation for the improper orientation of the motor and avoid the pooling effect described above.

The slinger of the present invention, in one form thereof, serves as the thrust washer for the rotor. The slinger is pressed onto a brass sleeve on the rotor shaft thereby providing a seal which prevents the flow of lubricant along the shaft and through the slinger so that all the lubricant will be thrown outwardly by the slinger. The fact that the rotor sleeve is pressed within a cylindrical rim portion of the slinger results in a seal around a cylindrical surface rather than on a flat face, as is the case with prior slingers, and produces a better seal against the axial flow of lubricant along the shaft.

Automated assembly of the motor is enhanced in accordance with one form of the invention by providing radial clearance between the cup-shaped portion of the slinger and the end of the sleeve bearing and between the central opening in the slinger and the rotor shaft. In carrying out one preferred method, the cup portion of the slinger is placed over the end of the sleeve bearing, the rotor shaft is then inserted through the slinger and into the bearing, and when the enlarged brass sleeve on the rotor shaft contacts the trailing edge of the slinger, it is able center the slinger on the shaft by virtue of the aforementioned radial clearances. Continued axial movement of the rotor sleeve presses it into the slinger thereby frictionally connecting the slinger and rotor and providing a seal against the flow of oil between the slinger and rotor sleeve. The edges of the slinger and rotor sleeve are preferably tapered to assist in centering of the slinger on the shaft and bearing.

In general, the invention provides, in one form thereof, a dynamoelectric machine comprising a case, a rotor in the case including a shaft, a bearing in the case for rotatably supporting the shaft, wherein the shaft extends out of one end of the bearing, and a lubricant reservoir in the case. Means associated with the shaft, such as a spiral groove therein, for example, is provided for pumping lubricant from the reservoir between the shaft and the bearing in the first axial direction and out of said one end of the bearing, and a lubricant slinger mounted on the shaft for rotation therewith throws radially outward from the shaft lubricant pumped out of the end of the bearing. The slinger has a flight or flights upstanding from a radially outer peripheral surface thereof and pitched in an axial direction for impelling with an axial component of velocity opposite the first axial direction lubricant pumped out of the end of the bearing.

Also in general, and in one form of the invention, a dynamoelectric machine is provided having a case, a stator and rotor in the case, a shaft connected to the rotor, a bearing enclosing a portion of the shaft, wherein a portion of the shaft extends out of a forward end of the bearing, and a lubricant reservoir in the case. Means associated with the shaft pumps lubricant from the reservoir along the shaft between the shaft and bearing in a forward axial direction and out of the forward end of the bearing. The improvement comprises a lubricant slinger mounted on the shaft adjacent the forward end of the bearing and rotated by the shaft, the slinger having a radially outer peripheral surface and at least one impeller surface upstanding from the peripheral surface and pitched in a generally rearward axial direction when the slinger is rotated by the shaft, whereby lubricant pumped out of the bearing forward end is impelled by the impeller surface with a rearward axial component of velocity.

There is also provided, in accordance with a form of the invention, a dynamoelectric machine having a stator, a rotor, a shaft connected to the rotor, a bearing for rotatably supporting the shaft, and a lubricant reservoir. Means associated with the shaft pumps lubricant from the reservoir forwardly along the shaft to lubricate the bearing, and a lubricant slinger is connected to the shaft and rotated by the shaft for throwing radially outward from the shaft lubricant pumped along the shaft by the means for pumping. An oil cover is radially spaced from and encloses the slinger. An impeller on the slinger rotated thereby has at least one vane pitched in a direction toward the reservoir when rotated by the slinger for impelling rearwardly toward the reservoir lubricant that is contacted by the vane.

In general, and in accordance with one form of the invention, there is provided a dynamoelectric machine having a stator, a rotor, a shaft connected to the rotor, a bearing for rotatably supporting the shaft, a lubricant reservoir and means associated with the shaft for pumping lubricant from the reservoir along the shaft through the bearing and out of one end of the bearing. An oil cover is radially spaced from and encloses a portion of the shaft, the cover having an opening in an end thereof through which the shaft extends from the bearing. The lubricant slinger connected to the shaft is rotated by the shaft for throwing radially outward against the oil cover lubricant pumped out of the bearing, and impeller means on the slinger rotated thereby throws lubricant pumped out of the bearing in a direction away from the oil cover opening.

In general, and in one form of the invention, there is provided a method for circulating lubricant through a dynamoelectric machine including a stator, a rotor, a shaft connected to the rotor and a bearing supporting the shaft. The method comprises pumping lubricant from a reservoir axially in a forward direction through the bearing to lubricate the bearing, the lubricant being pumped out of one end of the bearing. At least a portion of the lubricant that is pumped out of the bearing one end is thrown generally radially outward from the shaft against a surface disposed circumferentially around the shaft. At least a portion of the lubricant that has been thrown radially against the circumferentially disposed surface is impelled with a rearward axial component of velocity, and the radially thrown and axially impelled lubricant is returned back to the reservoir.

Still further, and in general, the dynamoelectric machine in one form of the invention comprises a case, a stator and rotor in the case, a bearing connected to the case, a shaft connected to the rotor and being rotatably received in the bearing, wherein the shaft extends out of one end of the bearing, and a lubricant reservoir. Means associated with the shaft pumps lubricant from the reservoir axially forward along the shaft between the shaft and bearing and out the end of the bearing. An oil slinger connected to the shaft and rotated thereby includes a surface means circumferentially disposed around and radially spaced from an end portion of the bearing including said one end for slinging radially outward from the shaft at a position axially rearward of the bearing one end lubricant pumped out of the bearing one end.

Still further and in general, a dynamoelectric machine in accordance with one form of the invention, comprises a case, a stator and rotor in the case, a bearing connected to the case, a shaft connected to the rotor and rotatably received in the bearing, the shaft extending out of one end of the bearing, a lubricant reservoir, and means associated with the shaft for pumping lubricant from the reservoir axially forward along the shaft between the shaft and bearing and out of one end of the bearing. An oil slinger connected to the shaft and rotated thereby includes an annular cup portion overhanging and radially spaced from and end portion of the bearing including said bearing one end and a portion of the bearing rearwardly adjacent said one end.

The invention also provides, in one form thereof, a dynamoelectric machine comprising a rotor, a bearing, a shaft connected to the rotor end being rotatably received in the bearing, the shaft extending out of one end of the bearing, a lubricant reservoir, and means associated with the shaft for pumping lubricant from the reservoir axially forward along the shaft between the shaft and bearing and out of said one end of the bearing. An oil slinger connected to the shaft and rotated thereby includes an annular cup portion overhanging and radially spaced from an end portion of the bearing including said bearing one end and a portion of the bearing rearwardly adjacent said one end. The slinger throws generally radially outward from the shaft lubricant pumped out of the bearing one end, and the cup portion of the slinger includes an outer peripheral surface and vane means upstanding from the outer peripheral surface of the cup portion and pitched in an axial rearward direction for impelling with a rearward axial component of velocity lubricant pumped out of the bearing one end.

Still further and in general, a method in one form of the invention is provided for assembling a rotor assembly in a dynamoelectric machine. A case having a sleeve bearing is provided, and there is also provided an oil slinger having a cylindrical cup portion, a central opening, and an annular rim having a trailing edge. The dynamoelectric machine includes a rotor having a shaft with a diameter smaller than the slinger central opening and a slinger seat coaxial with the shaft and having a leading edge. The cup portion of the slinger is placed over an end portion of the sleeve bearing such that the cup portion surrounds the bearing end portion, there being radial clearance between the bearing end portion and cup portion. An inner oil cover is placed over the oil slinger and connected to the case. The rotor shaft is then inserted through an opening in the oil cover, through the central opening in the oil slinger and into the sleeve bearing. The continued insertion of the shaft into the bearing causes the seat leading edge to contact the oil slinger rim trailing edge and center the oil slinger on the shaft. Further continued movement of the rotor press fits the seat into the slinger rim.

It is an object of the present invention to provide means for impeding the migration of lubricant within a dynamoelectric machine in a direction away from the reservoir once the lubricant has been pumped out of the bearing.

A further object of the invention, in one form thereof, is to impart a rearward axial velocity to droplets of lubricant slung outwardly by the slinger by impelling the droplets rearwardly through contact with a moving pitched vane or the like.

A still further object of the present invention, in one form thereof, is to throw the lubricant outwardly at a point rearward of the end of the bearing thereby further reducing the tendency of the lubricant to migrate out of the forward end of the semi-sealed lubricant circulation chamber.

Yet another object of the present invention, in one form thereof, is to provide a method for assembling a rotor and oil slinger assembly in a dynamoelectric machine which facilitates the use of automatic assembly equipment.

These as well as other objects and advantages of the present invention will be in part apparent and in part pointed out hereinafter.

DETAILED DESCRIPTION OF THE PREFERRED EMBODIMENT

Figure 1:
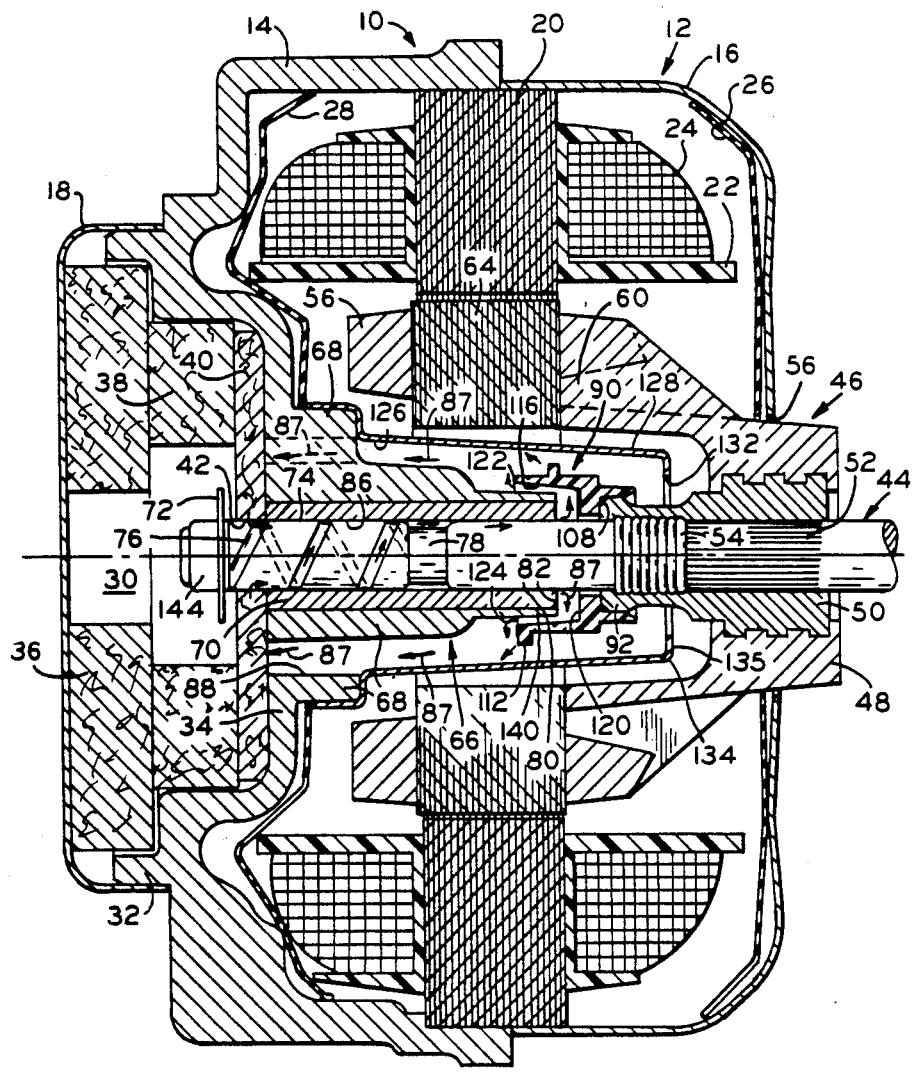
FIG. 1 is a sectional view of an electric motor including one form of the present invention.

Referring now to the drawings, and in particular to FIG. 1, motor 10 comprises case 12 having a cast iron or cast aluminum casing 14, a steel winding cover 16 and a steel oil reservoir cover 18. Disposed within case 12 are stator laminations 20, which have molded thereon polyester ground insulation 22. Stator windings 24 are wound on ground insulation 22, and winding cover 16 is sealingly connected to laminations 20 by means of a suitable adhesive. Paper-Mylar insulation 26 and 28 can be placed within case 12, if desired.

Oil reservoir 30 is formed between oil cover 18, which is sealingly connected to rim 32 on casing 14, and flange portion 34 of casing 14. Annular woolfelt wicks 36 and 38 are disposed within reservoir 30, and function to absorb and retain the lubricant for motor 10, such as an appropriate motor oil. A finer texture wick 40, which is also annular in shape, is in contact with wick 38 and its annular surface 42 is in contact with rotor shaft 44.

Rotor 46 comprises a cast aluminum hub portion 48 that is cast around brass sleeve 50, the latter including longitudinal knurls 52 and ring knurls 54. Shaft 44 is press fit into brass sleeve 50, and both shaft 44 and the end of rotor 46 extend outwardly through opening 56 in winding cover 16 such that shaft 44 can be connected to a suitable load, such as a fan for cooling condenser and evaporator coils in a refrigeration system. End rings 56 and 60 and rotor hub 48 are die cast around rotor laminations 64.

Casing 14 comprises sleeve bearing 66, which includes an annular portion 68 integral with casing 14, and a steel backed babbitt sleeve 70 press fit within portion 68 and machined out to size. Alternatively, sleeve 70 could be a sintered iron, cast iron or aluminum sleeve. Shaft 44 is rotatably received within bearing 66 and held in place, with a degree of axial freedom of movement, by a retainer washer 72 or other suitable connector.

The rear portion 74 of shaft 44 has an outer diameter slightly less than the inner diameter of bearing 66 and is provided with a helical groove 76, and undercut relief groove 78, and has a forward portion 80, which also has a diameter slightly less than the inner diameter of bearing 66. As shown, the portion 80 of shaft 44 extends out of the forward end 82 of bearing 66. The terms "forward" and "rearward" as used herein are for the purpose of explanation and to orient the direction of oil flow when motor 10 is operating. The rearward direction is the axial direction toward reservoir 30 and the forward direction is the axial direction away from reservoir 30. As shaft 44 is rotated by rotor 46 in the counter clockwise direction as viewed from the right end of the motor in FIG. 1, helical groove 76 picks up lubricant from wick 40 and carries it forwardly along shaft 44 thereby establishing a lubricant film between portions 74, 78 and 80 of shaft 44 and the inner surface 86 of bearing 66. Oil is pumped forwardly out of the forward end 82 of bearing 66 as illustrated by the arrows 87 in FIG. 1, and returns to reservoir 30 through four openings 88 in casing 14, as is customary in motors of this type.

Figure 2:
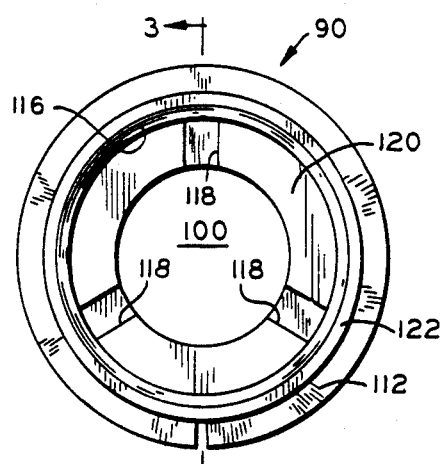
FIG. 2 is an enlarged top view of the lubricant slinger in accordance with the embodiment of the invention shown in FIG. 1.
Figure 3:
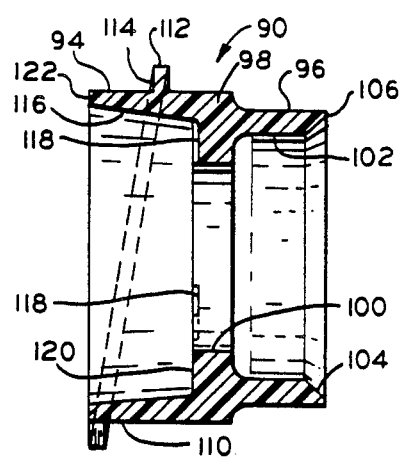
FIG. 3 is a sectional view of FIG. 2 taken along line 3—3 and viewed in the direction of the arrows.
Figure 4:
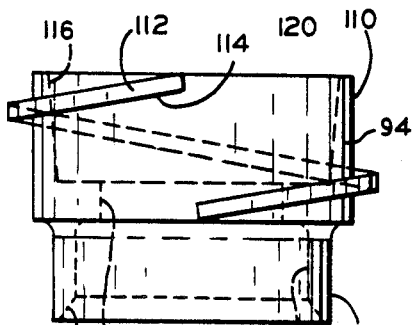
FIG. 4 is a side elevational view of the lubricant slinger of FIG. 2.

Lubricant slinger 90 is press fit on an enlarged seat portion 92 of brass sleeve 50 and is located immediately adjacent forward end 82 of bearing 66. With reference now to FIGS. 2, 3 and 4, lubricant slinger 90 will be described in detail. Lubricant slinger 90, which may be made of a NYLATRON material, VALOX, nylon or various rubber compounds, is of one piece molded construction and comprises a generally cylindrical cup-shaped portion 94, a generally cylindrical rim portion 96 and a center portion 98 having an opening 100 therethrough. Rim portion 96 has a diameter which is just slightly less than the diameter of seat portion 92 (FIG. 1) to enable seat portion 92 to be press fit against the cylindrical inner surface 102 thereof, and includes an inwardly tapered surface 104 on its trailing edge 106, which cooperates with the tapered leading edge 108 on seat 92 to assist in centering lubricant slinger 90 on shaft 44 and 66 as will be described hereinafter. Opening 100 has an inner diameter that is larger than the outer diameter of shaft 44, again for the purpose of alignment and automatic assembly.

The outer peripheral surface 110 of cup portion 94 has upstanding therefrom a single helical vane 112 that is just slightly less than 360° in length, thereby enabling easier molding of the part. Vane 112 includes a rearwardly facing throwing surface 114 which is pitched with a lead of approximately five turns per inch, although the pitch is not particularly critical as long as it is pitched in a direction such that lubricant is thrown rearwardly when rotor 46 is rotated in its normal direction. Obviously, oppositely pitched vanes would be used for motors having a reverse direction of rotation. Cup portion 94 includes a tapered inner surface 116 to assist in the rearward travel of lubricant, as will be described hereinafter. Furthermore, since slinger 90 also functions as a thrust washer against the end 82 of bearing 66, it is provided with a plurality of oil relief grooves 118 in its rearwardly facing surface 120, as is the case with prior art slingers.

As lubricant slinger 90 is rotated by shaft 44, oil which is pumped out of the end 82 of bearing 66 contacts surface 120 of slinger 190, and due to the centrifugal forces caused by rotating slinger 90, the lubricant is forced radially outwardly against tapered inner cylindrical surface 116 where it is caused to flow rearwardly until it reaches edge 122 of cup portion 94. At this point, it is thrown radially outward as indicated by arrows 124 against the inner surface 126 of tapered inner oil well cover 128, which is sealingly connected to shoulder 68 on casing 14. Many of the oil droplets which are thrown against inner surface 126 are caused to splash back where they will be contacted by rotating pitched vane 112 which, due to the angle of its pitch, will impel the droplets rearwardly toward reservoir 30. Additionally, any oil which travels along the outer peripheral surface 110 of slinger 90 will likewise be contacted by vane 112 and impelled rearwardly.

The effect of the impeller comprising vane 112 is to prevent the lubricant from migrating forwardly and out of the opening 132 in the forward end 134 of inner oil well cover 128 through which rotor shaft 44 and brass sleeve 50 extend. If lubricant were permitted to migrate out of opening 132, it would be thrown outwardly by rotor 46 and be lost within the stator chamber.

Because inner oil well cover 128 is tapered, oil which settles in the lower portion thereof will be caused to flow by gravity back toward reservoir 30, and this will occur even if motor 10 should be tilted slightly forwardly, thereby preventing pooling of lubricant within the forward portion of oil well cover 128.

The droplets of oil which are contacted by rotating vane 112 will typically be impelled rearwardly in a direction which has both a rearward axial component of velocity as well as a radial component of velocity, the latter due to centrifugal forces produced by rotating slinger 90. The net result is that oil is thrown in a direction generally opposite opening 132 such that it has an axial component of velocity which is in a direction opposite the axial flow of pumping along shaft 44. The oil seal between seat 92 pressed within the rim portion 96 of slinger 90 prevents oil from migrating forwardly past this point.

Inner oil well cover 128 extends forwardly past the forward end of oil slinger 90 and includes an inwardly extending flange 135. Due to the tapered shape of oil cover 128 which diverges in the rearward direction, no splash oil wick is necessary in the forward portion of inner oil well cover 128, as is typically used in many prior art motors of this type.

The height of vane 112 is not critical, although it has been found that the higher vane 112 is, the better will be the rearward impelling action. Clearance between vane 112 and the inner surface 126 of cover 128 is the limiting constraint, however. As was indicated earlier, vane 112 could be of multiple turns, although a single turn slightly less than 360° is preferred because of the ease in molding. Alternatively, a plurality of pitched impeller blades or other structure which produces a rearward impelling action when rotated could be utilized.

Figure 8:
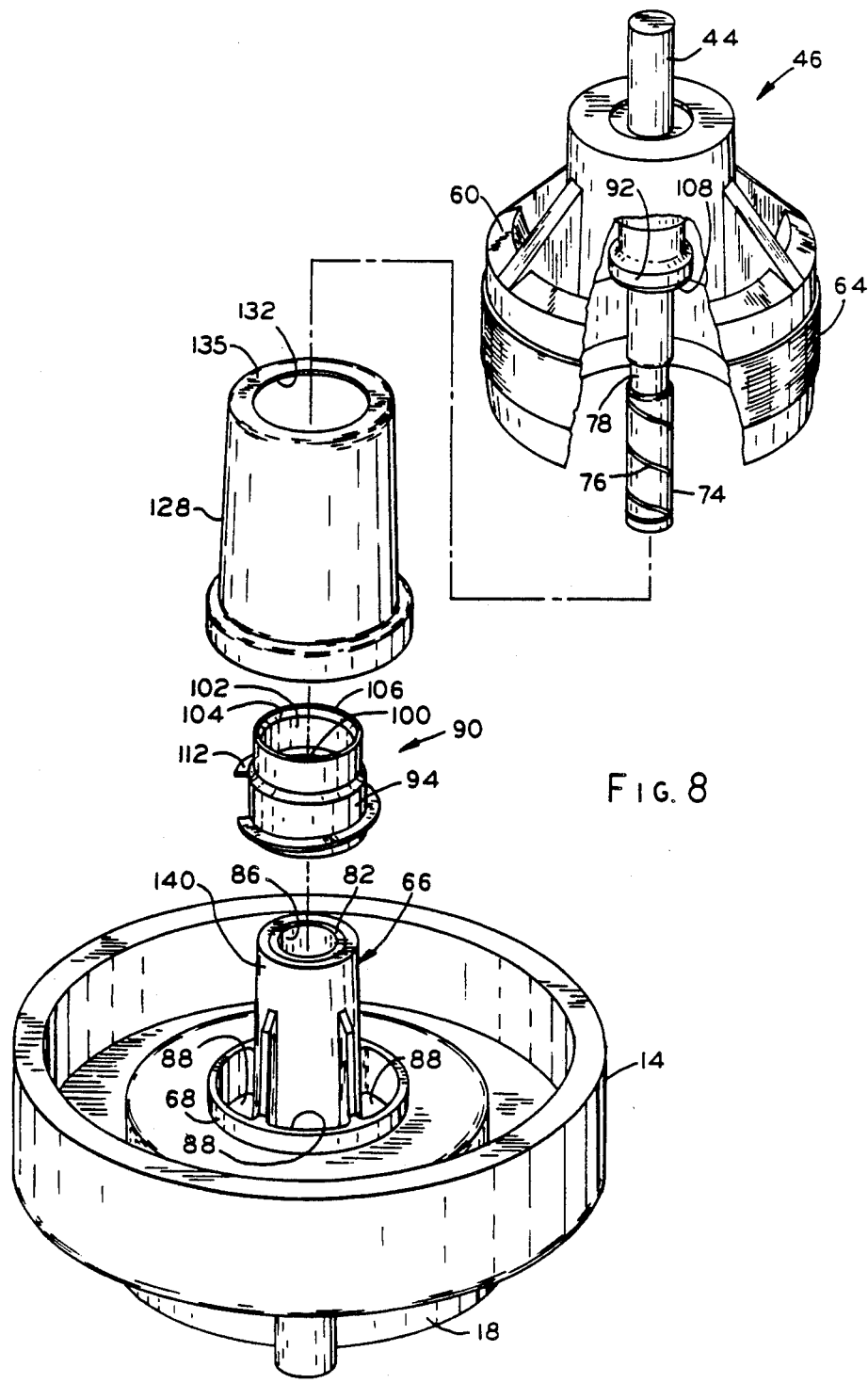
FIG. 8 is an enlarged perspective view illustrating the assembly of the rotor, oil well cover, slinger and motor case of the embodiment shown in FIG. 1.

With reference to FIGS. 1 and 8, a method for assembling the preferred embodiment illustrated in FIG. 1 is illustrated. This assembly can be accomplished by automatic machinery (not shown), thereby reducing the cost and time of manufacture.

Motor casing 14 is oriented such that bearing 66 is vertical and lubricant slinger 90 is placed on the forward end 82 of bearing 66 such that cup portion 94 surrounds the forward end portion 140 of bearing 66. Since the inner diameter of slinger cup portion 94 is larger than the outer diameter of bearing forward end portion 40, there is clearance between oil slinger 90 and bearing forward portion 140 thereby enabling slinger 90 to "float" thereon. Next, inner oil well cover 128 is lowered over slinger 90 and bearing 66 and seated against shoulder 68 on casing 14. A suitable adhesive, such as a silicon compound, can be used to provide a fluid-tight seal between oil well cover 128 and shoulder 68.

Next, rotor 124 is lowered over inner oil well cover 128 and shaft 44 is inserted into opening 86 in bearing 66. As the tapered leading edge 108 of rotor seat 92 contacts tapered trailing edge 92 of slinger rim portion 96, slinger 90 will be centered on bearing 66 and shaft 44 because the outer diameter of shaft 44 is smaller than the inner diameter of slinger opening 100, as is apparent from FIG. 1. Once slinger 90 has been centered due to the camming action between tapered surfaces 104 and 108, continued downward movement of rotor 46 will press seat 92 into frictional engagement with the inner cylindrical wall 102 of slinger 90, thereby frictionally connecting slinger 90 to rotor 46. Attachment of push fastener 72 (FIG. 1) on the rear end 144 of shaft 44 locks the rotor assembly to casing 14. Axial movement of shaft 44 in the rearward direction is limited by the abutment of the thrust face 120 of slinger 90 against end 82 of bearing 66. When stator windings 24 are activated, magnetic forces align rotor laminations 64 with stator laminations 20 to the position shown in FIG. 1.

The automatic centering of slinger 90 enables the use a automatic machinery rotatably difficult to consistently align rotor shaft 44 with the center of opening 100 in slinger 90. Because of the radial clearance between slinger 90 and bearing 66 and shaft 44, even though shaft 44 enters opening 100 in slinger 90 off the true center, the camming action will radially align slinger 90 and enable the press fit between seat 92 and rim portion 96.

Figure 5:
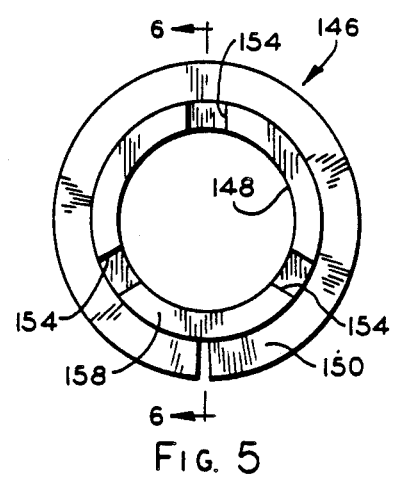
FIG. 5 is an enlarged top view showing a modified form of the lubricant slinger.
Figure 6:
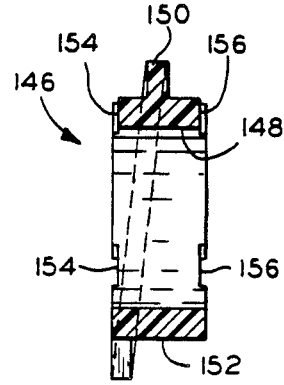
FIG. 6 is a sectional view taken along line 6—6 of FIG. 5 and viewed in the direction of the arrows.
Figure 7:
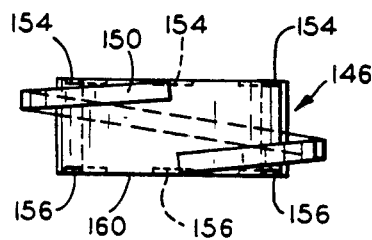
FIG. 7 is a side elevational view of the lubricant slinger of FIG. 5.

Due to space limitations in some motors, it may not always be possible to use the type of slinger shown in FIGS. 2, 3 and 4, and it may be necessary to use a slinger 146 of the type shown in FIGS. 5, 6 and 7, for example. Slinger 146 has an opening 148 therethrough which would be slightly smaller than the outer diameter of the rotor shaft or seat (not shown) so that it can be press fit thereon. An impeller vane 150, again being a single turn slightly less than 360° for ease in molding, is upstanding from the outer peripheral surface 152 of slinger 146 and is pitched such that when slinger 146 is rotated, oil droplets will be impelled rearwardly similarly to the action of slinger 90. For example, vane 150 could have a pitch of ten turns per inch, and have an outer diameter which is as large as possible given the space limitations imposed by the inner oil well cover used.

Oil relief grooves 154 and 156 are provided in the thrust faces 158 and 660, respectively, to avoid the formation of an oil seal which would prevent the normal recirculation of oil through the motor bearing.

Although the invention has been described in terms of a preferred embodiment, it is contemplated that changes as to the precise arrangements, shapes, details and connections of the component parts of the motor, as well as the precise structure of the slinger and the steps of the methods may be made by those having ordinary skill in the art without departing from the spirit of the invention or the scope thereof as set out by the claims which follow.

I claim:

1. In a dynamoelectric machine including a stator, a rotor, a shaft connected to the rotor, a bearing supporting the shaft, and a lubricant reservoir, a method of circulating lubricant through the machine comprising: pumping lubricant from the reservoir axially in a forward direction through the bearing to lubricate the bearing, and pumping the lubricant out of one end of the bearing; throwing at least a portion of the lubricant that is pumped out of the bearing one end generally radially outwardly from the shaft against a surface disposed circumferentially around the shaft; impelling through space, with a rearward axial component of velocity, at least a portion of the lubricant that has been thrown radially against the circumferentially disposed surface; and returning the radially thrown and axially impelled lubricant back to the reservoir.

2. The method of claim 1 wherein the lubricant is axially impelled by striking the lubricant with a rotating vane.

* * * * *